July 15, 1958   G. F. SIMON ET AL   2,843,380
BUCKING HORSE APPARATUS
Filed Feb. 15, 1957

INVENTORS
GEORGE F. SIMON
MARCUS J. SIMON
JEROME G. SIMON
LEO F. SIMON
BY McMorrow, Berman & Davidson
ATTORNEYS United States Patent Office 2,843,380
Patented July 15, 1958

2,843,380

BUCKING HORSE APPARATUS

George F. Simon, Marcus J. Simon, Jerome G. Simon, and Leo F. Simon, all of Colwich, Kans.

Application February 15, 1957, Serial No. 640,545

4 Claims. (Cl. 272—53.1)

This invention relates to improvements in mechanical horse apparatus, such as used as exhibits or as "rides" at carnivals and other places, and more particularly to improved bucking horse apparatus of this kind.

The primary object of this invention is to provide more realistic-acting apparatus of this kind which affords a more thrilling and adventurous "ride" either for a dummy rider on the horse or for live riders.

Another object of the invention is to provide more efficient and practical power-operated apparatus of the character indicated above which can be either in a stationary form or in a mobile form wherein the apparatus includes a motor vehicle as a base, which vehicle can be driven in a manner to simulate the turnings and the sidewise movements of a bucking horse in addition to bucking movements.

Other important objects and advantageous features of the invention will be apparent from the following description and the accompanying drawings, wherein, for purposes of illustration only, a specific embodiment of the invention is set forth in detail.

Figure 1:
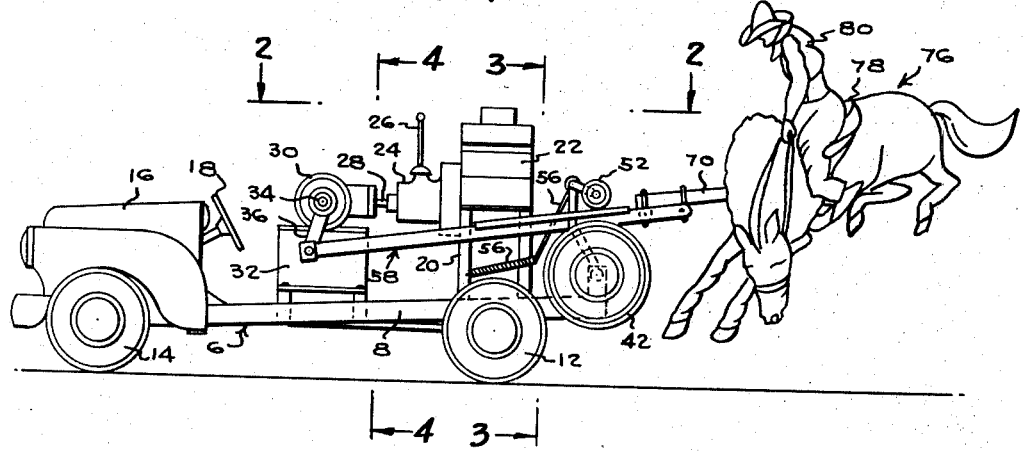
Figure 1 is a side elevational view of apparatus in accordance with the present invention.
Figure 2:
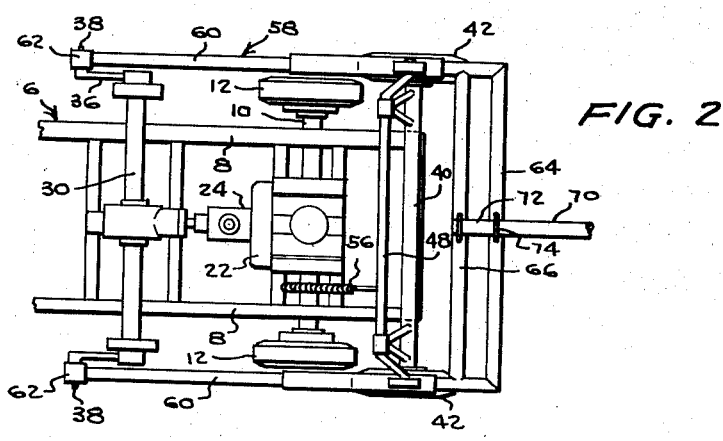
Figure 2 is a fragmentary top plan view taken on the line 2—2 of Figure 1.
Figures 3, 4:
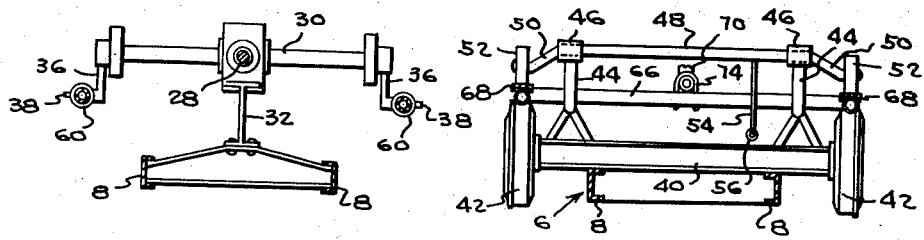

Figures 3 and 4 are transverse vertical sections taken on the lines 3—3 and 4—4, respectively, of Figure 1.

Referring in detail to the drawings, wherein like numerals designate like parts throughout the several views, the illustrated apparatus comprises a horizontal base frame 6, which can be a stationary support, but is herein exemplified as a motor vehicle chassis frame having spaced longitudinal channel side members 8, mounted near their rear ends on a rear axle 10 having rear wheels 12 thereon, and mounted near their forward ends on a front suspension which includes front wheels 14. Both the front wheels 14 and the rear wheels 12 can be steerable, so as to increase the realism of the action of the apparatus in simulating sidewise and turning actions of a bucking horse while being driven over the ground. On the front of the chassis frame 6 is a conventional vehicle motor 16 and steering wheel 18.

Fixedly mounted on the frame 6, preferably over the rear wheels 12 and rising above the frame 6 is a motor support 20 upon which is mounted a second motor 22 having a forwardly extending manually shiftable transmission 24 having a shift lever 26. The transmission 24 is connected by a forwardly projecting shaft 28 to the gearing (not shown) of a differential axle housing 30 which is fixedly mounted upon the upper end of a support 32 secured to and rising from the chassis frame 6 and is rearwardly spaced from the vehicle engine or motor 16.

The differential housing 30 extends transversely of the frame 6 and its axle shafts 34 terminate at their outer ends in crank arms 36 having lateral pintles 38 on their free ends.

Fixed upon the chassis side members 8, as shown in Figure 3, is a transverse beam 40 which reaches beyond opposite sides of the frame 6 and has relatively large, free-running, rubber-tired wheels 42 journaled on its end. A pair of forwardly inclined rigid brackets 44 rise fixedly from the beam 40 near the wheels 42 and have journals 46 on their upper ends, displaced forwardly of the axis of the wheels 42 and spaced above the wheels 42.

Journaled in the journals 46 is a transverse rock shaft 48 having on its opposite ends rearwardly, downwardly, and laterally outwardly declining arms 50 which have journaled on their free ends rubber-tired, realtively small hold-down wheels 52 which are in the vertical planes of the wheels 42 and are spaced thereabove. Fixed to the rock shaft 48 between the brackets 44 is a forwardly declining depending arm 54, and a contractile spring 56 is stretched between the lower end of the arm 54 and a forward part of the motor support 20 and serves to yieldably urge the hold-down wheels 52 downwardly toward the wheels 42.

A generally horizontal U-shaped oscillating frame 58, wider than the chassis frame 6, has longitudinal legs 60 having journals 62 on their forward ends which are journaled on the pintles 38 on the crank arms 36, and a transverse bight portion 64 extending between and joining the rear ends of the legs 60. A bracing cross member 66 extends between and is fixed to the legs 60 at a point near and forwardly of the bight portion 64.

The oscillating frame legs 60 rest freely upon the wheels 42 at points near the cross member 66, and in this region the legs 60 have fixed to their upper sides flat longitudinal tracks 68 upon which the hold-down wheels 52 bear in holding the oscillating frame 58 in operative and support engagement with the wheels 42.

A longitudinal rearwardly projecting boom 70, extending rearwardly from the oscillating frame 58 in the plane thereof, has a forward end portion 72 secured, as indicated at 74, to the bight portion 64 and the cross member 66. On the rear end of the boom 70 is mounted a bucking horse figure 76 including a saddle 78. Secured in the saddle 78 is a rider figure 80 or, when the apparatus is to be used as a "ride" rather than as an exhibit, the saddle 78 is devoid of a figure 80 and is open to receive a live rider.

In operation, with the motor 22 running, the operator of the apparatus shifts the transmission 24 so as to transmit power at the desired relative speed to the differential and cause rotation of the crank arms 36. This rotation of the crank arms 36 oscillates the frame 58 forwardly, downwardly, upwardly, and rearwardly on the wheels 42 and causes the horse figure 76 to move in realistic bucking movements, which are further enhanced by the amount of play which inherently exists between the oscillating frame legs 60 and the wheels, which is restrained within desired limits by the bearing of the spring-pressed hold-down wheels 52 on the tracks 68 on the frame legs 60.

Although we have shown and described herein a specific embodiment of our invention, it is to be understood that any change or changes in the construction and in the relative arrangements of components thereof are contemplated as being within the scope of the subjoined claims.

What is claimed is:

1. In bucking horse apparatus, a horizontal base having a forward end and a rear end, a motor mounted on said base between its ends, transverse axle means mounted on the base forwardly of said motor, transmission means operatively connecting the motor with said axle means, said axle means having an axle shaft having laterally outward ends terminating in crank arms having lateral pintles, a pair of laterally spaced free running wheels journaled on said base behind said motor, a generally horizontal oscillating frame having legs disposed at opposite sides of said motor, said frame legs having forward ends which have journals thereon journaled on said pintles and rear ends, cross bar means fixed to and spacing and connecting the rear ends of said legs, said legs having rear end portions freely resting upon said free-running wheels, bracket means rising from said base in the region of said free-running wheels, a transverse rock shaft journaled on said bracket means, arms on said rock shaft carrying hold-down wheels bearing down upon said oscillating frame legs, spring means urging the hold-down wheels downwardly into hold-down engagement with the frame legs, and a boom having a forward end portion fixed to said cross bar means, said boom extending rearwardly from said oscillating frame and having a rear end, and a bucking horse figure mounted on the rear end of the boom.

2. In a bucking horse apparatus, a horizontal base having forward and rear ends, a transverse horizontal shaft journaled on an intermediate part of said base and having a crank arm on an end thereof, a free-running wheel mounted on said base behind said transverse shaft, a horizontal frame including a leg extending longitudinally of said base, said leg having a forward end journaled on said crank arm and a rear end, said leg resting upon said free-running wheel and extending rearwardly therefrom, a spring-pressed hold-down wheel mounted on said base and bearing downwardly upon an intermediate part of said frame leg, a bucking horse figure mounted on the rear end of said frame leg, and motor means on said base operatively connected to said transverse shaft.

3. In a bucking horse apparatus, a horizontal base having forward and rear ends, a transverse horizontal shaft journaled on an intermediate part of said base and having a crank arm on an end thereof, a free-running wheel mounted on said base behind said transverse shaft, a horizontal frame including a leg extending longitudinally of said base, said leg having a forward end journaled on said crank arm and a rear end, said leg resting upon said free-running wheel and extending rearwardly therefrom, a spring-pressed hold-down wheel mounted on said base and bearing downwardly upon an intermediate part of said frame leg, a bucking horse figure mounted on the rear end of said frame leg, and motor means on said base operatively connected to said transverse shaft, said motor means being located between said transverse shaft and said free-running wheel.

4. In a bucking horse apparatus, a horizontal base having a rear end, a transverse shaft journaled on said base forwardly of said rear end, said transverse shaft having crank arms on its ends, laterally spaced free-running wheels mounted on said base at said rear end, a U-shaped horizontal frame comprising a cross bar and legs extending forwardly from the cross bar, said legs having forward ends operatively connected to said crank arms and intermediate portions resting upon said free-running wheels, spring-pressed hold-down wheels mounted on said base and bearing downwardly upon the frame legs in the regions of the free-running wheels, motor means on the base operatively connected to said transverse shaft, and a bucking horse figure mounted on and extending rearwardly from said frame.

References Cited in the file of this patent
UNITED STATES PATENTS

| | | |
|---|---|---|
| 1,671,162 | Peters | May 29, 1928 |
| 2,637,554 | Terreson | May 5, 1953 |
| 2,726,870 | Auger | Dec. 13, 1955 |